United States Patent [19]

Gidner

[11] 4,272,052
[45] Jun. 9, 1981

[54] FLUSH VALVES

[75] Inventor: Robert R. Gidner, Fairview, Pa.

[73] Assignee: Zurn Industries, Inc., Erie, Pa.

[21] Appl. No.: 36,524

[22] Filed: May 7, 1979

[51] Int. Cl.³ .................................... F16K 31/143
[52] U.S. Cl. ................................... 251/39; 251/40
[58] Field of Search ................ 251/39, 40, 43, 44, 251/45, 46, 33; 137/238

[56] References Cited

U.S. PATENT DOCUMENTS

| | | | |
|---|---|---|---|
| 1,394,895 | 10/1921 | Griffin | 251/39 |
| 1,934,545 | 11/1933 | Langdon | 251/39 |
| 2,502,335 | 3/1950 | Metzger | 251/40 |
| 2,613,688 | 10/1952 | Knaggs | 251/39 |
| 3,008,682 | 11/1961 | Filliung et al. | 251/44 |
| 3,008,683 | 11/1961 | Filliung et al. | 251/30 |
| 3,279,742 | 10/1966 | Billeter | 251/40 |
| 3,399,860 | 9/1968 | Billeter et al. | 251/37 |
| 3,400,731 | 9/1968 | McCornack | 251/39 |
| 3,842,857 | 10/1974 | McCornack | 251/39 |

Primary Examiner—Martin P. Schwadron
Assistant Examiner—G. L. Walton
Attorney, Agent, or Firm—Robert R. Hussey

[57] ABSTRACT

A flush valve for releasing a predetermined volume of liquid upon actuation thereof includes a valve housing having an inlet, an outlet, a valve seating surface circumventing the inlet and a piston housing portion adjacent to the outlet. The piston is movable between an opened and a closed position and has one end sealable with the valve seating surface when the piston is in the closed position to block the flow of liquid from the inlet to the outlet. Upon actuation of the valve, the piston is unsealed from the seating surface to permit liquid to flow from the inlet to the outlet. The other end of the piston is sealed to the piston housing portion and a control chamber is provided having an expanding portion between the piston and the piston housing portion. Restricted flow of liquid from the control chamber to the outlet is permitted. Means are provided for selectively conducting the pressurized liquid from the inlet to the control chamber to create a resultant force urging the piston to the open position upon actuation of the valve and for disconnecting the pressurized liquid from the inlet to the control chamber when the piston reaches the open position. Means are provided for adjusting the predetermined volume of the liquid released by the flush valve upon actuation thereof and for limiting the volume of liquid released by the flush valve to the predetermined amount.

15 Claims, 5 Drawing Figures

FIG.5

FLUSH VALVES

BACKGROUND OF THE INVENTION

This invention relates to a flush valve and more specifically to a flush valve for releasing a predetermined volume of liquid upon actuation thereof.

Flush valves are used to release a predetermined volume of liquid from a source of pressurized liquid upon actuation thereof. One common use of flush valves is in connection with plumbing fixtures such as urinals, water closet bowls, mop sinks or the like. The inlet of the flush valve is connected to a water line having pressurized water therein and the outlet is connected to the plumbing fixture. Upon actuation, the flush valve releases a predetermined volume of water into the plumbing fixture.

When a flush valve is in a normally closed position, it is desirable to block the flow of the pressurized liquid in the inlet from both the outlet and the internal operating components of the valve. U.S. Pat. Nos. 3,008,682, 3,008,683, 3,279,742 and 3,399,860 disclose flush valves of various constructions which depend for their operation on the pressurized liquid from the inlet to be conducted through various passages in the internal working components of the valve and contained in various chambers in the valve with various sealing devices when the valve is in the closed position. Consequently, these internal working components of the valve are constantly exposed to the pressurized liquid from the inlet. Various points of leakage of the pressurized liquid, both internal and external, may occur when the internal working components of the valve are exposed to the pressurized liquid and the valve is in the closed position. It is desirable to isolate the points of leakage in a flush valve to minimize replacement costs and repair problems.

Each of these references also require that the chamber between the piston and the housing be capable of maintaining pressurized liquid therein so that the valve will move from an open to a closed position. If leakage, either internal or external, from this chamber occurs, the operation of the valve will be impaired or even inoperative depending on the amount of leakage.

Since these flush valve designs require pressurized liquid in certain of their operative chambers and passageways, and depend for their operation on pressurized liquid in the various chambers and passageways of their working components, if the liquid pressure at the inlet is lost or becomes a negative pressure the operation of the valve is impaired even after a positive liquid pressure is restored at the inlet. Generally, a check valve or a stop valve is used in the conduit supplying pressurized liquid to the inlet of these flush valves. The stop valve operates to close the liquid supply conduit leading to the inlet of these flush valves when pressure in the line is lost and reconnect the liquid supply conduit when pressure is restored in the line. Such stop valves are used in an attempt to keep liquid in the operational chambers and passageways of these flush valves so that they will be operative when liquid pressure is restored.

It is desirable to adjust the predetermined volume of liquid released by a flush valve. Such an adjustable flush valve may be used in the installation of different plumbing fixtures since different fixtures require different volumes of liquid. An adjustable flush valve may also be used to compensate for the particular liquid source pressure and flow rate of the liquid supplied to the flush valve at any particular installation site. The pressure and flow rate of the liquid supplied to the flush valve are dependent on a number of varying factors, for example, the pressure on the liquid at its origin, the size of the transporting pipes and the height of the installation.

Several flush valves which provide for adjusting the predetermined volume of liquid released are known. The flush valves disclosed in Filliung et al, U.S. Pat. No. 3,008,682 and Filliung et al, U.S. Pat. No. 3,008,683 provide for adjusting the volume of liquid released by means of an adjustable mechanical stop which adjustably limits the movement of the piston. The use of restriction rings to adjust the amount of liquid released by a flush valve is disclosed in Billeter et al, U.S. Pat. No. 3,399,860 but this flush valve construction requires disassembly of the valve to change the restricting rings.

It is also desirable to limit the volume of liquid released by a flush valve to the predetermined amount even if the valve remains in an actuated position. Such a volume limiting feature operates to save the use of unnecessary amounts of liquid.

Various designs have attempted to provide for limiting the volume of liquid released by a flush valve to the predetermined amount even if the valve remains in an actuated position as disclosed in U.S. Pat. Nos. 3,008,682, 3,008,683, 3,279,742 and 3,399,860. Each of these designs depend on the maintenance of a smooth sliding relationship of various parts of the valve and that gravitational forces will be sufficient to return the volume limiting device to the operating actuatable condition.

It is desirable that a flush valve be constructed to decrease the size, weight and cost of its manufacture. It is also desirable to provide a flush valve having decreased sensitivity to variations and fluctuations in the liquid pressure supplied to the inlet of the valve. Another desirable feature is a flush valve capable of operating with a liquid having small particles therein.

SUMMARY OF THE PRESENT INVENTION

The present invention provides the above-described desirable features with a new and improved flush valve for releasing a predetermined volume of liquid upon actuation thereof. The flush valve of the present invention provides a housing having an inlet, an outlet, a valve seating surface circumventing the inlet and a piston housing portion adjacent to the outlet. The piston is movable between an open and a closed position and has one end sealable with the valve seating surface when the piston is in the closed position to block the flow of liquid from the inlet to the outlet and the working components of the valve. Upon actuation of the valve, the piston is unsealed from the seating surface to permit liquid to flow from the inlet to the outlet. The other end of the piston is sealed to the piston housing portion and a control chamber is provided having an expanding portion between the piston and the piston housing portion. Restricted flow of liquid between the control chamber and the outlet is permitted. Means are provided for selectively conducting the pressurized liquid from the inlet to the control chamber to create a resultant force urging the piston to the open position upon actuation of the valve and for disconnecting the pressurized liquid from the inlet to the control chamber when the piston reaches the open position.

The flush valve of the present invention achieves the above-mentioned desirable feature of sealing the inlet from the outlet and the working components of the valve when the valve is closed. Such a design provides a flush valve with improved operational dependability and reliability. If the liquid pressure is lost and then restored, the flush valve of the present invention is operative without the need for a stop valve in the conduit leading to the inlet. In addition, the flush valve construction of the present invention isolates and minimizes the points of leakage of the valve to minimize replacement costs and repair problems.

A flush valve constructed in accordance with the present invention includes means for adjusting the predetermined volume of liquid released by the flush valve upon actuation thereof and for limiting the volume of liquid released by the flush valve to the predetermined amount. The adjusting and limiting means of the present invention includes an actuating valve member having one end mounted on a control valve member, such as the piston, and movable between an open position and a closed position. An extension member is slideably mounted along the other end of the actuating valve member and is resiliently urged toward that end.

A tripping mechanism is mounted to the housing and has a tripping member with one end positioned adjacent to a portion of the extension member when the control valve member is in the closed position. The tripping member is movable upon actuation thereof to move the control valve member to the open position. The adjusting and limiting means also provide for the adjustment of the tripping member at various positions along the extension member to adjust the predetermined volume of liquid released by the valve.

DETAILED DESCRIPTION OF THE INVENTION

Figures 1, 2:
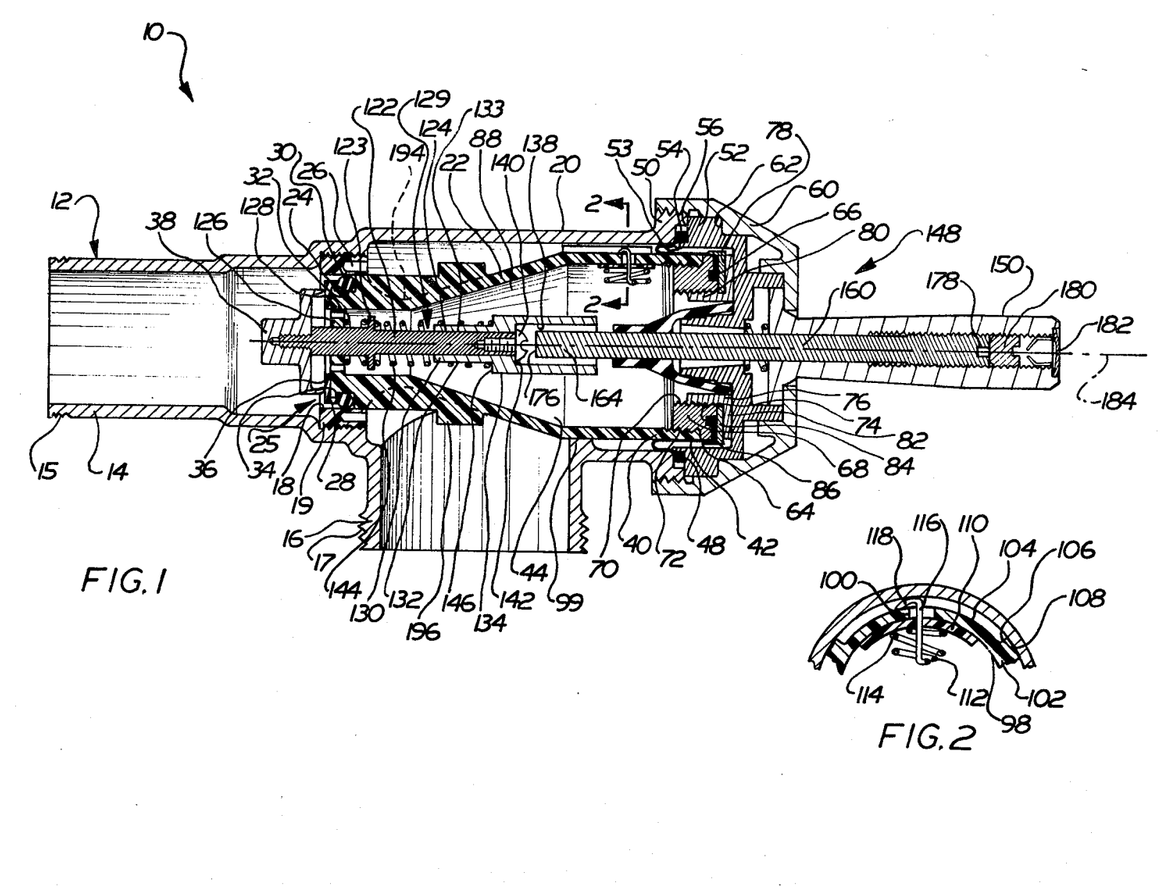
FIG. 1 is a cross-sectional side elevational view of a flush valve of the present invention in a closed deactivated position.
FIG. 2 is an enlarged cross-sectional view of a portion of the flush valve shown in FIG. 1 and taken along line 2—2 thereof.

Referring now, more specifically, to the drawings and in particular FIG. 1, a flush valve 10 embodying the features of the present invention is shown for releasing a predetermined volume of liquid upon actuation thereof. The flush valve 10 includes a valve housing, generally indicated at 12, having an inlet 14, an outlet 16, a valve seating surface 18 circumscribing the inlet and a piston housing portion 20 positioned adjacent to the outlet. The inlet 14 and the outlet 16 have threaded portions, generally indicated at 15 and 17 respectively, to provide for connecting the inlet 14 to a source of pressurized liquid and to connect the outlet 16 to a plumbing fixture.

Figures 3, 4:
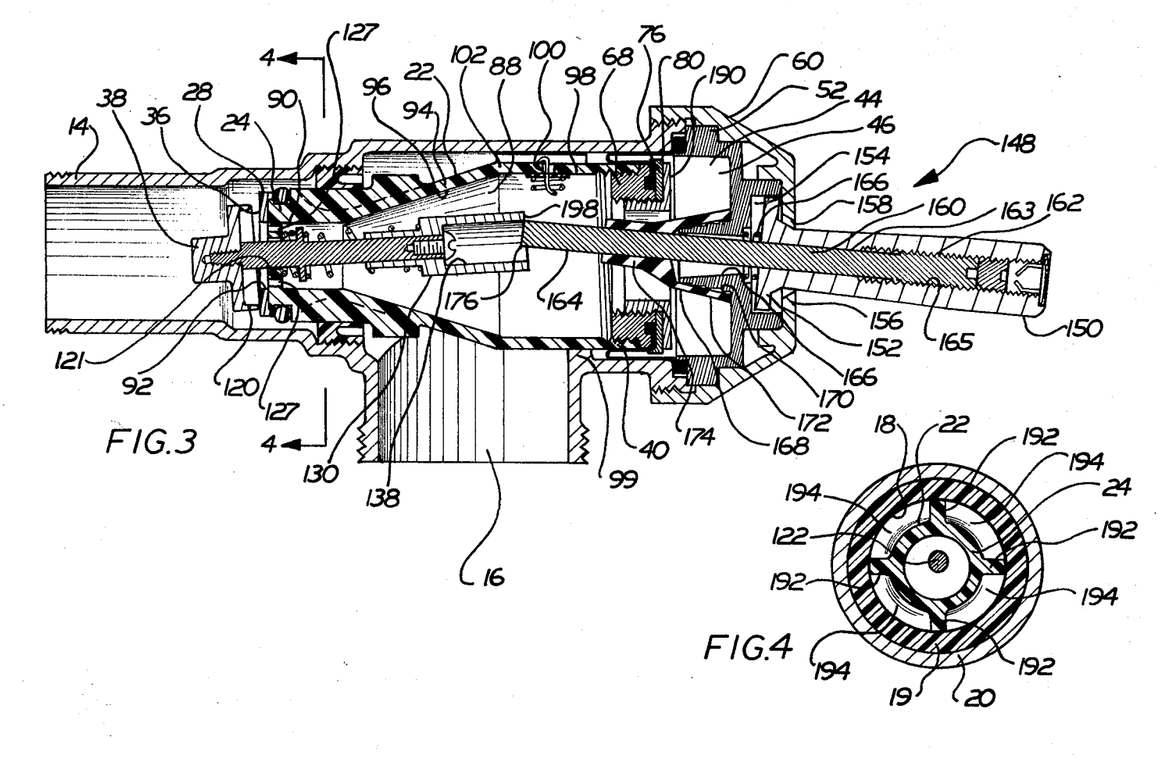
FIG. 3 is a cross-sectional side elevational view of the flush valve shown in FIG. 1 in an open position.
FIG. 4 is an enlarged cross-sectional view of a portion of the flush valve shown in FIG. 3 and taken along line 4—4 thereof.

The flush valve 10 also includes a piston 22 which is movable between a closed position seen in FIG. 1 and an open position as seen in FIG. 3. The piston 22 cooperates with the valve seating surface 18 to provide a control valve 25 which is movable between an open position in which liquid flows from the inlet 14 to the outlet 16 and a closed position in which the flow of liquid from the inlet to the outlet is blocked. The piston 22 has an end, generally indicated at 24, which is sealable with the valve seating surface 18 when the piston is in the closed position to block the flow of liquid from the inlet 14 to the outlet 16.

To seal the end 24 of the piston 22 with the valve seating surface 18, a seal or sealing member 28 is provided. The sealing member 28 has an enlarged "O" ring type portion 30 which is received in and retained by a notch or groove 32 about the end 24 of the piston 22. The sealing member 28 has a portion 34 extending outwardly along the piston 22 and terminating in an inwardly extending portion 36 of the sealing member 28. The inwardly extending portion 36 of the sealing member 28 cooperates with the trip plate 38 to selectively seal the end 24 of the piston 22 from the pressurized liquid in the inlet 14 in a manner as will be hereinafter more fully described.

As can be seen by the above description, the end 24 of the piston 22 operates to seal the inlet 14 from the outlet 16 and from the other working components of the valve 10 when in the closed position. It is within the contemplation of this invention that other sealing techniques may be used to provide a seal between the inlet 14 and piston end 24. For example, a sealing portion on the piston 22 may be provided which extends radially of the piston end 24 and seats against a complimentary radial seating surface on the housing 12 circumventing the inlet 14. By sealing the pressurized liquid in the inlet 14 from the outlet 16 and the internal working components of the valve 10, certain of the advantages of the present invention as described above are achieved. Upon actuation of the valve 10, the piston 22 is unsealed from the seating surface 18 to permit liquid to flow from the inlet 14 to the outlet 16.

To provide for movement of the piston 22 from the closed position to the open position, the other end of the piston, generally indicated at 40, is sealed by the rolling diaphragm 42 to the piston housing portion 20 of the valve housing 12. A control chamber 44 is provided having an expanding portion 46, as seen in FIG. 3, between the piston 22 and the valve housing 12. The rolling diaphragm 42 has an enlarged outer circular "O" ring type portion 48 which is clamped between the retaining member 52 and the end portion 50 of the valve housing 12. The end portion 50 and the retaining member 52 have complimentary opposing surfaces 54 and 56 which are urged together to retain the outer "O" ring portion 48 of the diaphragm 42 therebetween.

To urge the retaining member 52 towards the end portion 50 of the valve housing 12, the valve housing includes a valve cap 60 which threadedly engages the end portion 50. The valve cap 60 has an abutment 62 thereon for contacting the retaining ring 52. When the valve cap 60 is tightened on the end 50, the retaining ring 52 is urged towards the end 50 thereby compressing the outer "O" ring portion 48 of the diaphragm 42 and effectuates a seal therebetween.

To seal the piston 22 to the valve housing 12, the rolling diaphragm 42 has an elongated portion 64 extending from the outer "O" ring portion 48 and terminating in an inner "O" ring portion 66. To secure the inner "O" ring portion 66 of the rolling diaphragm to the piston 22, a piston retainer ring 68 is provided having inner and outer threaded portions 70, 72 respectively. The outer threaded portion 72 of the piston retainer ring 68 is threadedly engaged by complimentary threads on the end 40 of the piston 22. The piston retainer ring 68 has a circular groove 74 therearound for receiving the inner "O" ring portion 66 therein.

To clamp the inner "O" ring portion 66 in the groove 74, the clamping ring 76 and the clamping washer 78 are provided. The clamping ring 76 has a portion 80 which threadedly engages the inner threads 70 on the piston retainer ring 68. The clamping washer 78 has a radial portion 84 positioned between the radial extending portion 82 of the clamping ring 76 and the groove 74 on the piston retainer ring 68. The washer 78 also has an annular portion 86 extending axially along a portion of the outside of the rolling diaphragm portion 64 and adjacent to the outside of the end 40 of the piston 22. To clamp the inner "O" ring portion 66 of the diaphragm 42 to the piston 22, the piston clamping ring 76 is tightened on the piston retainer ring 68 and urges the clamping washer 78 towards the groove 74. Accordingly, the inner "O" ring portion 66 of the rolling diaphragm 42 is clamped therebetween.

The clamping washer 78 is provided to minimize damage to the rolling diaphragm 42 as it is secured to the piston 22. The annular section 86 of the clamping washer 78 and the retainer portion 53 of the retainer ring 52 are provided to assure that the rolling diaphragm 42 rolls in the proper direction during operation of the valve 10 as will be hereinafter described.

As seen in FIG. 3, the piston 22 has an internal chamber 88 which operates to conduct pressurized liquid from the inlet 14 to the expansion chamber 46 and is part of the control chamber 44, as will hereinafter be more fully described. The end 24 of the piston 22 has an aperture 90 therein defining a portion of the chamber 88. The aperture 90 passes through the end 24 of the piston 22. The radially inwardly extending portion 36 of the seal 28 terminates in an opening 92 which permits liquid to flow through the opening 90. The trip plate 38 provides a closure for the piston chamber 88 and is selectively movable between an open and a closed position as will be hereinafter more fully described.

A sloping radially extending wall 94 extends from the walls of the opening 90. The wall 94 has an inner surface 96 extending toward the enlarged end 40 of the piston 22 and defines another portion of the internal piston chamber 88. The sloping inner surface 96 terminates in the axially extending surfaces 98 of the piston wall portion 102 which extend towards the end 40 of the piston 22. The piston chamber 88 is also described by the surfaces 98, portions of the piston retainer ring 68 and the piston clamping member 76.

To provide for restricted flow of liquid between the control chamber 44 and the outlet 16, an orifice 100 is provided through the piston chamber wall 102 of the piston 22 as seen in FIG. 1. The orifice 100 extends from the inner surface 98 to the outer surface 104 of the wall portion 102. The outer surface 104 defines the bottom of the recess or indentation, generally indicated at 106 in FIG. 2. The recess 106 allows for the free flow of liquid between the orifice 100 and the outlet 16. The outer surface 108 of the wall 102 is in contact with the housing 12 and serves to support the piston 22 as the piston slides in the housing. The housing 12 also includes a support portion 99 for supporting the other side of the end portion 40 so that the piston 22 is slideably supported therealong.

To filter out any particles that may be inside the piston chamber 88, a filter 110 is positioned adjacent to the inner surface 98 and over the orifice 100. The filter 110 may be of any known filter material such as a porous expanded plastic. The filter 110 is secured across the orifice 100 by means of a spring 112 which resiliently urges the filter 110 towards the surface 98 of the piston 22. The spring 112 has a coil portion 114 and a retainer portion 116 extending through the coil portion 114 and the orifice 100. The spring 112 has a contact lip or retainer portion 118 extending from the extending portion 116 to hold the spring 112 and consequently the filter 110 across the orifice 100.

As can be seen from the above, when particles are in the piston chamber 88, the filter 110 filters out these particles so that they do not block or impede the flow of liquid through the orifice 100. If such blockage were allowed to occur, the speed at which the piston 22 moves between an open position and a closed position would change and consequently the amount of water released by the valve 10 would change. It should be unerstood that the filter material is of sufficient porosity so that even when particles are trapped therein, any liquid under pressure in the chamber 44 can flow freely therefrom.

It should be understood that the rate at which the piston 22 moves from an open position to a closed position is dependent on the effective size of the orifice 100 and takes into account the effective decrease in the size of the orifice as a result of the extending portion 116 of the spring 112 passing therethrough. The larger the effective size of the orifice, the faster the valve piston 22 will move from an open position to a closed position and accordingly a lesser amount of fluid will be released. In the preferred design, the orifice 100 is sized to give a flush volume of 8 gallons when the tripping member 160 is fully extended as will be further described. The volume of the liquid released by the valve 10 may be varied by adjusting the tripping member 160 along the length of the extension member 130 down to one pint per flush. Thus, the valve can be adjusted to release the predetermined volume of liquid necessary for the particular plumbing fixture that it is used in conjunction with.

The valve 10 includes means for selectively connecting and disconnecting pressurized liquid from the inlet 14 to the control chamber 44. The trip plate or actuating valve member 38 is positioned across the opening 90 of the piston 22. As seen in FIGS. 1 and 3, the trip plate 38 has sealing portions 120 which seal the opening 90 of the piston 22 from the pressurized liquid in the inlet 14 when the trip plate 38 is in the closed position.

To maintain the trip plate 38 in the closed position, the trip plate 38 has a trip arm 122 secured to one end thereof by any conventional means such as cooperating threads. It should be understood that it is within the contemplation of this invention that one unitary actuating valve member may be provided which includes the trip plate 38 and the trip arm 122. The trip arm 122 extends through the opening 121 in the end support portion 126 of the piston 22 and into the piston chamber 88. The trip arm 122 has a flange portion 123 between the trip plate 38 and the other end portion 124 of the trip arm 122.

An end support portion 126 of the piston 22 extends across the opening 90 and is centrally located therein. The end support portion 126 has a plurality of openings 127 therethrough which allow for the flow of liquid through the opening 90 of the piston chamber 88 and into the expanding chamber 46. The openings 127 define a portion of the aperture 90 passing through the end 24 of the piston 22. The trip arm 122 is slideably received and supported by the end support portion 126 which operate to maintain the trip arm 122 and consequently the trip plate 38 in a centrally located position so that the trip plate 38 will seal the opening 90 of the piston 22 when in the closed position. The opening 121 in the end support portion 126 is sufficiently large to allow for tilting of the trip plate 38 to actuate the valve 10 as will be hereinafter described.

To maintain the trip plate 38 in a normally closed position, a spring 128 is provided and is positioned between the end support portion 126 and the flange 123 on the trip arm 122. The spring 128 is operative to urge the trip plate 38 towards the sealing member 28 in a sealing relationship therewith when the valve 10 is in an unactuated condition.

The actuating valve stem 129 includes the trip arm 122 and the tubular extension member 130. The tubular extension member 130 is provided to limit the volume of liquid released by the valve 10 to a predetermined amount. The extension member 130 is slideably mounted on the end 124 of the trip arm 122. The tubular extension member 130 has a tubular end portion 132 having an aperture 133 therein through which the trip arm 122 is slideably received. The extension member 130 has an enlarged tubular end portion 134 having an opening 138 therein. A threaded fastener 140 is provided to retain the extension member 130 on the end 134 of the trip arm 122 and stop the extension member from sliding off the end of the trip arm. The threaded fastener 140 is threadedly engaged by the end 124 of the trip arm 122 and contacts the shoulder portion 142 of the opening 138.

To maintain the extension member 130 in an extreme end position when it is not actuated, a spring 144 is provided. The spring 144 is positioned between the flange 123 and the shoulder 146 on the extension member 130. The spring 144 operates to urge the extension member 130 towards the end 124 of the trip arm 122 but allows the extension member 130 to slide along the trip arm 122 to limit the volume of liquid released by the valve 10, as will be hereinafter more fully described.

A triggering or tripping mechanism, generally indicated at 148, is provided for moving the trip plate 38 from a closed to an open position, as seen in FIGS. 1 and 3. The tripping mechanism 148 includes a handle 150 which is movable to actuate the valve 10. The handle 150 has a flange portion 152 on one end thereof which is received in a cavity 154 in the retaining member 52. To retain the handle in the cavity 154, the valve cap 60 has a radially extending portion 156 with an opening 158 therein through which the handle 150 extends. The opening 158 in the cap 60 is sufficiently large to allow for tilting of the handle 150 to actuate the valve 10.

A tripping member 160 is provided and has a threaded end portion 162 which threadedly engages complimentary internal threads 165 in the central opening 163 of the handle 150. The tripping member 160 passes through the opening 163 in the handle 150 and has an end portion 164 which extends inwardly of the handle into the piston housing chamber 88. The end portion 164 of the tripping member 160 is received in the opening 138 of the extension member 130 when the valve is in an unactuated position and the extension member 130 and tripping arm 122 are in alignment with the axis 184, as seen in FIG. 1. The above-described feature of adjustability between the tripping member 160 and the extension member 130 provides for adjusting the predetermined volume of liquid released by the valve 10 as will be hereinafter more fully described.

A spring 166 is provided to resiliently maintain the handle 150 and tripping member 160 in a neutral or unactuated position and in alignment with the axis 184. The spring 166 is positioned about the tripping member 160 and between the retaining member 52 and the flange 152 of the handle 150. The end portion 164 of the tripping member 160 extends through an opening 167 in the retaining member 52, which is sufficiently large to allow for actuatable tilting of the tripping member 160.

To seal the opening 167 from the control chamber 44, a sealing member 168 is provided. An inclined stepped portion 170 is provided on the retaining member 52 to receive the enlarged end portion 172 of the seal 168 in a sealing relationship therewith. The other end 174 of the sealing member 168 has an opening therethrough through which the tripping member 160 passes. The end 174 of the seal 168 seals pressurized liquid in the control chamber 44 from flowing past the tripping member 160 into the opening 167 while allowing for adjustment of the tripping member therealong.

To provide for adjustment of the volume of liquid released by the valve 10 upon actuation thereof, the tripping member 160 is adjustable at various positions along the end portion 134 of the extension member 130 seen in FIG. 1. To adjust the end 176 of the tripping member 160 at various positions along the extension member 130, a screwdriver is inserted into the slot 178 of the tripping member 160 to rotate the tripping member. Upon rotation of the tripping member 160 the complimentary threaded portions 162 and 165 provide for axial movement of the tripping member along the extension member 130. As will be hereinafter more fully described in connection with the operation of the flush valve 10, when the end 176 of the tripping member 160 is moved toward the extension member 130, the volume of liquid released by the valve 10 will be increased. When the end 176 is moved away from the extension member, the volume of liquid released by the valve 10 is decreased.

When the end 176 is in the desired position, the locking screw 180 is threaded into the end of the handle 150 to lock the tripping member 160 in position. A protective end cap 182 is provided to cover the threaded end of the handle 150.

When the valve 10 is in the closed unactuated position as seen in FIG. 1, the trip arm 122, extension member 130, tripping member 160 and handle 150 are in axial alignment with each other along the axis 184. In the closed position, the trip plate 38 is sealed against the seal 28 and the seal 28 is sealed against the seating surface 18 about the inlet 14 so that pressurized liquid in the inlet is blocked from flowing to the outlet 16 and into the control chamber 44 of the piston 22. When the piston 22 is in the closed position, the pressurized liquid exerts a force on the piston 22 acting on the respective component areas of the trip plate 38 and the seat 28 to maintain the piston 22 in the closed position. The clamping ring 76 of the piston 22 contacts the retaining member 52 of the housing 12 to limit movement of the piston.

To actuate the valve 10, a side force is applied to the handle 150 which tilts the handle 150 in the cavity 154 against the force exerted by the spring 166 and off the axis 184. By tilting the handle 150, the end portion 164 of the tripping member 160 is tilted in an opposite direction and the end 176 of the tripping member contacts the extension member 130. A force exerted on the extension member 130 by the tripping member 160 causes the extension member, and consequently the trip arm 122, to move sidewardly off the axis 184 which in turn tilts the trip plate 38, unseating it from the seal 28.

The pressurized liquid in the inlet 14 flows past the trip plate 38 through the openings 121 and into the control chamber 44. The pressurized liquid flows into the internal piston chamber 88 to the expansion chamber 46. The pressurized liquid is contained in the control chamber 44 and only a minor amount of liquid flows through the orifice 100.

When pressurized liquid is conducted into the control chamber 44, the pressurized liquid operates against the vertical components of the internal surfaces of the piston 22 including surface 96 and surface 190 of clamping ring 80 and rolling diaphragm 42. These vertical component surfaces have a sufficiently great area to overcome the forces exerted by the pressurized liquid from the inlet 14 on the piston 22 tending to close the valve since the end 40 of the piston 22 is larger than the end 24. As the liquid pressure builds up in the control chamber 44, a resultant force is created to urge the piston 22 to an open position. As the piston 22 begins to slide in the housing 12 from a closed position towards the open position, the seal 28 maintains contact with the sealing surface 18 to allow additional pressure to build up in the control chamber 44. The end 176 of the tripping member 160 slides along the extension member 130 to keep the tripping plate 38 in an open position.

As the piston 22 continues to move to an open position, the expansion chamber 46 continues to expand to maintain movement of the piston 22 towards the open position. As the piston 22 continues to move, the seal 28 moves past the seating surface 18 and the support flanges 192, as seen in FIG. 4, contact the seating surface 18 of the seating member 19 to support the piston for continued movement towards the open position.

To connect the inlet 14 to the outlet 16, the outlet passages 194 are provided in the piston 22 between the support flanges 192. When the outlet passages 194 are open to the pressurized liquid from the inlet 14, pressurized liquid from the inlet flows through the outlet passages 194 into the outlet 16 to release a predetermined volume of pressurized liquid.

The piston 22 continues to move to the open position until the end 198 of the extension member 130 moves past the end 176 of the tripping member 160. In this position, the tripping member 160 no longer holds the trip plate in a tilted position and the spring 128 returns the trip plate 38 to a sealed position with respect to the seal member 28. Even if the triggering mechanism 148 remains in an actuated position, the trip plate 38 returns to a sealed position when the end 198 of the extension member 130 moves past the end 176 of the tripping member 160 to thereby limit the volume of liquid released by the flush valve as will be hereinafter more fully described.

The control chamber 44 is thereby sealed from the inlet 14 and the pressurized liquid contained in the control chamber flows through the orifice 100 to the outlet 16. As the liquid flows from the control chamber 44 and the pressure of the liquid in the control chamber decreases, the pressure of the pressurized liquid in the inlet 14 creates a resultant force on the end of the piston 22 including the trip plate 38 and the seal 28 to return the piston to the closed position shown in FIG. 1.

To limit any over travel of the piston 22, the stop flange portions 196 are provided on the support flanges 192 and operate to contact the seating member 19 to limit the open position of the valve. These stop flanges are used to contact the seating member 19 when the tripping member 160 is overextended and are provided as a precautionary measure to stop over travel of the piston 22.

Once the piston 22 is returned to the closed position, the piston remains in the closed position as described above until the handle is again tilted to an actuated position. As stated above, the volume of liquid released by the valve may be varied by adjusting the effective length of the tripping member 160 with respect to the handle 150. This allows the valve 10 to be adjusted to release a predetermined volume of liquid necessary for the particular plumbing fixture that it is used in conjunction with. Any amount of liquid released by the valve 10 greater than the predetermined amount is unnecessary to the operation of the plumbing fixture and in fact, increases the costs of operation. Accordingly, it is desirable to provide means for limiting the volume of the liquid released by the flush valve 10.

The present invention provides means to limit the volume of liquid releases by the flush valve 10 upon actuation thereof. The means for limiting the volume of liquid released by the flush valve 10 allows the piston 22 to move from an open position to a closed position even if the handle 150 is held in an actuated tilt position after the piston reaches the open position.

Figure 5:
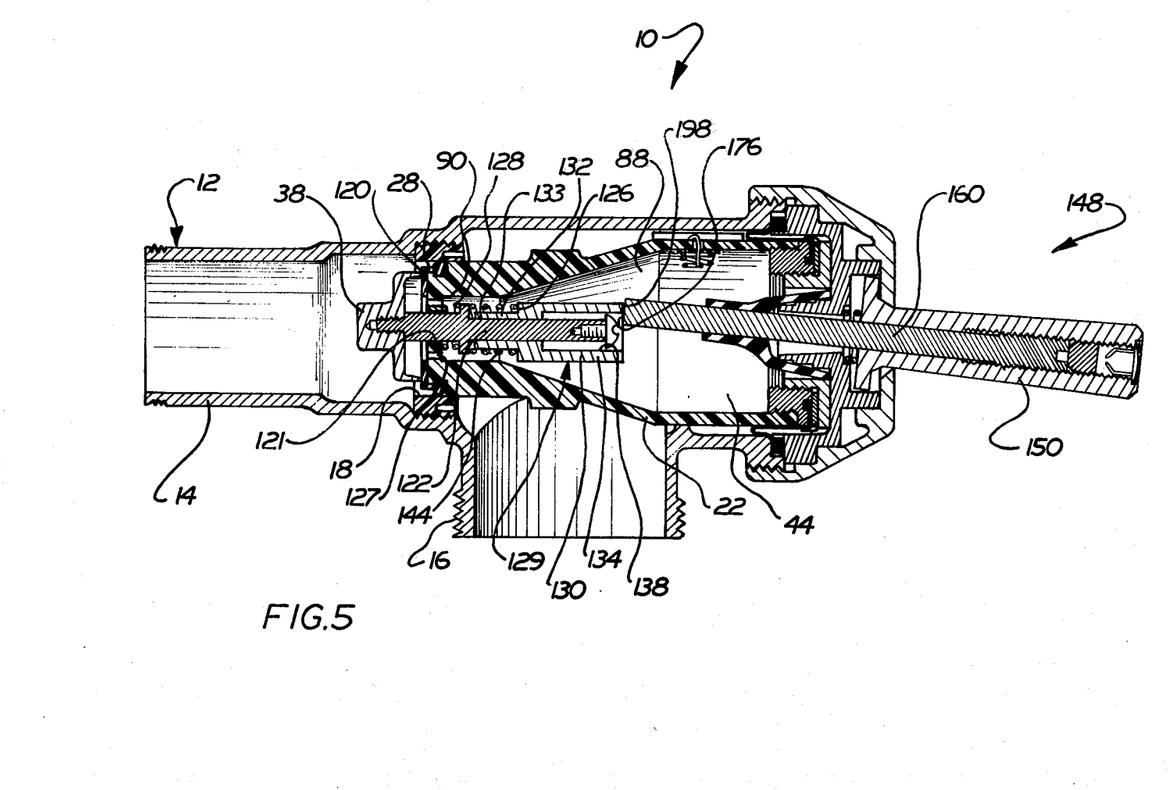
FIG. 5 is a cross-sectional side elevational view of the flush valve shown in FIG. 1 in a closed position.

As can be seen from FIGS. 3 and 5, when the handle 150 is held in an actuated tilted position after the piston 22 reaches the open position, the end 198 of the extension member 130 moves past the end 176 of the tripping member 160. In this position, the spring 128 urges the trip arm 122 towards a neutral position where it is in alignment with the axis 184. As the trip arm 122 moves towards the neutral position, the end 198 of the extension member 130 moves across the end 176 of the tripping member 160 until the trip arm 122 is in the closed or neutral position and is in alignment with the axis 184. In this closed position, the trip plate 38 is in a sealed relationship with the sealing member 28. The flow of pressurized liquid from the inlet 14 through the opening 90 to the control chamber 44 is thereby sealed and liquid flows from the control chamber 44 through the orifice 100 to the outlet 16.

If the handle 150 is held in an actuated tilted position, the tripping member 160 is positioned so that the end 198 of the extension member 130 is in contact with the end 176 of the tripping member. As the liquid flows from the control chamber 44 and the pressure of the liquid in the control chamber decreases, the pressure on the pressurized liquid in the inlet 14 creates a resultant force in the end of the piston 22 to urge the piston toward the closed position as shown in FIG. 1. As stated above, the tubular extension member 130 is slideably mounted on the trip arm 122 and is urged toward the extreme end position by the spring 144. It should be clearly understood that the extension member 130 is free to slide along the trip arm 122 until the piston 22 is in the closed position regardless of the position of adjustment of the tripping member 160 with respect to the handle 150.

The force urging the piston 22 towards the closed position is sufficient to overcome the force exerted by the spring 144. Consequently, the extension member 130 slides along the end 124 of the trip arm 122 as the piston 22 moves toward the closed position shown in FIG. 5 even though the handle 150 is held in an actuated tilted position and the trip plate 38 remains in a sealed position. Accordingly, the volume of liquid released by the valve 10 is limited even though the handle 150 is held in the actuated tilted position throughout the operation of the valve 10.

When the handle 150 is released and returned by the spring 166 to its neutral non-actuated position, the end 176 of the tripping member 160 slides along the end 198 of the extension member 130 until it is in alignment with the opening 138 of the extension member and the axis 184. The spring 144 then urges the extension member 130 to slide on the trip arm 122 towards the end 124 of the trip arm. The opening 138 of the extension member 130 receives the tripping member 160 therein as seen in FIG. 1 so that the valve 10 is available for reactivation upon depressing the handle 150. As can be seen from the above, the valve 10 cannot be reactivated until the handle 150 is released and recentered along the axis 184 by the spring 166 and the end portion 164 of the tripping member 160 is received in the opening 138 of the extension member 130.

As the piston moves from the open to the closed position, the seal member 28 contacts the seating surface 18 to seal the inlet 14 from the outlet 16 and the internal components of the piston 22. Further movement of the piston towards the closed direction is stopped by the contact of the piston clamping ring 76 and the retaining member 52. It should be understood that other means may be provided to limit further movement of the piston 22 towards the closed position.

At a given setting of the tripping member 160, the flush valve 10 delivers a constant volume of water each time it is actuated over a wide range of inlet pressures. The higher the inlet pressure, the higher the volume rate through the valve 10 but the volume released by the valve remains substantially the same since the piston 22 moves at a higher rate of speed due to the higher inlet pressure. Having described my invention, I claim:

1. A flush valve for releasing a predetermined volume of liquid upon actuation thereof comprising:
    a. a valve housing having an inlet with liquid under pressure therein, an outlet, and a valve seating surface between said inlet and said outlet,
    b. a control valve sealable with said valve seating surface and movable between an open position in which liquid flows from said inlet to said outlet and a closed position in which the flow of liquid from said inlet to said outlet is blocked,
    c. a control chamber between said control valve and said housing,
    d. means for adjusting the predetermined volume of liquid released by said flush valve upon actuation thereof,
    e. means for limiting the volume of liquid released by said flush valve to the predetermined amount,
    f. an actuating valve member connected to said control valve and movable between an open position in which said control chamber is connected to one of said inlet and said outlet and a closed position in which said control chamber is disconnected from said one of said inlet and said outlet,
    g. said limiting means including an extension member slideably mounted along one end of said actuating valve member,
    h. said limiting means having means for resiliently urging said extension member toward the one end of said actuating valve member, and
    i. a tripping mechanism mounted to said housing having a tripping member having one end positioned adjacent to said extension member when said control valve is in the closed position, said one end of said tripping member movable upon actuation thereof to move said actuating member to the open position,
    j. said adjusting means including means for positioning said tripping member at various positions along said extension member to adjust the predetermined volume of liquid released by said valve.

2. A flush valve as described in claim 1 including means for providing restricted flow of liquid from said control chamber to said outlet including an orifice connecting said control chamber to said outlet, a filter for removing particles from the liquid flowing through said orifice positioned adjacent to said orifice and means for retaining said filter adjacent to said orifice.

3. A flush valve as described in claim 2 wherein said means for retaining said filter adjacent to said orifice includes a spring having a coil portion engaging said filter, an extending portion extending through said filter and said orifice and a retainer portion for engaging said control valve.

4. A flush valve for releasing liquid upon actuation thereof, said flush valve comprising a housing having an inlet and an outlet, a valve seat located in said housing, a first valve member having a closed position in sealing engagement with the valve seat and movable relative to the valve seat to an open position, said first valve member when in an open position allowing fluid to flow from said inlet to said outlet, means for moving said first valve member from said closed position to an open position and back to said closed position including a second valve member movable to direct fluid pressure into a chamber associated with said first valve member, an increase in the pressure in said chamber acting on said first valve member to effect movement thereof from said closed to said open position, means for effecting movement of said second valve member to said open position comprising a trip arm member which has a portion extending exteriorly of said valve housing and which is manually movable to an actuated position, and means for enabling said second valve member to close and thus effect closing of said first valve member even if said trip arm is held in an actuated position, said last-recited means including a mechanical connection between said second valve member and said trip arm, said mechanical connection including a first portion connected to one of said trip arm member and second valve member and a second portion of the other of said trip arm member and second valve member slideably movable relative to said first portion and being disengageable therefrom upon a predetermined amount of movement of said second valve member, and means for moving said second valve member to a closed position when said first and second portions become disengaged.

5. A flush valve as defined in claim 4 wherein one of said first or second portions is adjustable to vary the extent of relative movement therebetween before disengagement occurs and thereby vary the extent of movement of said second valve member to an open position before returning to its closed position.

6. A flush valve as defined in claim 5 wherein said second valve includes a valve stem and said first portion comprises a sleeve member slideably mounted on said valve stem and said second portion comprises a rod adjustably connected to said trip arm and received within said sleeve portion when said first valve is in said closed position, and means supporting said rod portion and said trip arm for pivotal movement relative to said housing to thereby effect pivotal movement of said second valve to its open position.

7. A flush valve as defined in claim 6 further including a first spring means for biasing said trip arm to an unactuated position and said means for moving said second valve member to a closed position when said first and second portions become disengaged comprises a second spring means for biasing said second valve to its closed position.

8. A flush valve as defined in claim 7 wherein said first valve member comprises a piston member having a valve surface at one end thereof for sealing engagement with said valve seat, said piston member at the other end thereof being connected to said housing by a flexible diaphragm which permits said piston member to move relative to said housing while providing a seal between said piston member and said housing, said piston member being hollow and in part defining said chamber, and means for providing restricted flow of liquid from said chamber to said outlet including an orifice in said piston connecting said chamber to said outlet.

9. A flush valve for releasing liquid upon actuation thereof comprising:
   a. a valve housing having an inlet and an outlet, a valve seat surface circumscribing said inlet,
   b. a piston received in said housing and movable between an open and a closed position relative to said valve seat surface,
   c. said piston having one end sealable with said valve seat surface when said piston is in the closed position which blocks liquid from flowing from said inlet to said outlet and movable from said valve seat surface upon actuation of said flush valve which permits liquid to flow from said inlet to said outlet,
   d. a control chamber sealable from said inlet when said piston is in the closed position and having an expanding portion between said piston and said housing,
   e. means for providing restricted flow of liquid from said control chamber to said outlet,
   f. valve means for selectively connecting the pressurized liquid from said inlet to said control chamber creating a resultant force urging said piston to the open position upon actuation of said flush valve and for disconnecting the pressurized liquid from said inlet to said control chamber when said piston reaches an open position,
   g. said valve means for selectively connecting and disconnecting the pressurized liquid from said inlet to said control chamber including an actuating valve member connected to said piston and movable between an open position in which said control chamber is connected to said inlet and a closed position in which said control chamber is disconnected from said inlet, and
   h. means for limiting the volume of liquid released by said flush valve including an extension arm slideably mounted along one end of said actuating valve member.

10. A flush valve as described in claim 9 including means for resiliently urging said extension arm towards the one end of said actuating valve member.

11. A flush valve as described in claim 9 including a tripping mechanism mounted to said housing having a tripping member having one end positioned adjacent to said extension arm when said piston is in the closed position, said one end of said tripping member movable upon actuation thereof to move said actuating valve to the open position.

12. A flush valve for releasing liquid upon actuation thereof comprising:
   a. a valve housing having an inlet and an outlet, a valve seat surface circumscribing said inlet,
   b. a piston received in said housing and movable between an open and a closed position,
   c. said piston having one end sealable with said valve seat surface when said piston is in the closed position which blocks liquid from flowing from said inlet to said outlet and unsealable from said valve seat surface upon actuation of said flush valve which permits liquid to flow from said inlet to said outlet,
   d. a control chamber sealable from said inlet when said piston is in the closed position and having an expanding portion between said piston and said housing,
   e. means for providing restricted flow of liquid from said control chamber to said outlet,
   f. valve means for communicating the pressurized liquid from said inlet to said control chamber creating a resultant force urging said piston to the open position upon actuation of said flush valve and for blocking the pressurized liquid from said inlet to said control chamber when said piston reaches an open position,
   g. said means for communicating and blocking the the pressurized liquid from said inlet to said control chamber including an actuating valve arm connected to said piston and movable between an open position to actuate said valve means to communicate said control chamber to said inlet and a closed position in which said valve means blocks communication of said control chamber from said inlet,
   h. a tripping mechanism mounted to said housing having a tripping member having one end positioned adjacent to said actuating valve arm, said tripping member movable to move said actuating valve arm to an open position, and
   i. adjusting means for positioning said one end of said tripping member at various positions along said actuating valve arm to adjust the volume of liquid released by said valve.

13. A flush valve as described in claim 12 wherein said actuating valve arm includes an extension member slideably mounted along one end thereof, said tripping member positioned adjacent to said extension member when said piston is in the closed position, said adjusting means including means for positioning said one end of said tripping member at various positions along said extension member to adjust the volume of liquid released by said valve.

14. A flush valve for releasing a volume of liquid upon actuation thereof comprising:
   a. a valve housing having an inlet and an outlet, a valve seat surface circumscribing said inlet,
   b. a piston received in said valve housing and movable between an open and a closed position, c. said piston having one end sealable with said valve seat surface of said housing when said piston is in the closed position which blocks liquid from flowing from said inlet to said outlet and unsealable from said valve seat surface upon actuation of said flush valve which permits liquid to flow from said inlet to said outlet, d. a control chamber sealable from said inlet when said piston is in the closed position and having an expanding portion between said piston and said valve housing, e. means for providing restricted flow of liquid from said control chamber to said outlet, f. valve means for selectively connecting the pressurized liquid from said inlet to said control chamber creating a resultant force urging said piston to the open position upon actuation of said valve and for disconnecting the pressurized liquid from said inlet to said control chamber when said piston reaches the open position, g. said valve means for selectively connecting and disconnecting the pressurized liquid from said inlet to said control chamber including an actuating valve arm connected to said piston and movable between an open position in which said control chamber is connected to said inlet and a closed position in which said control chamber is disconnected from said inlet, h. said actuating valve arm including an extension member slideably mounted along one end thereof and having an opening therein which is positioned along an axis when said piston is in the closed inactuated position, i. a tripping mechanism mounted to said housing having a tripping member having one end positioned adjacent to said actuating valve arm, said tripping member movable to move said actuating arm to the open position, said one end of said tripping member received in said opening in said extension member and positioned along said axis of said opening of said extension member when said extension member is in the closed position, and j. means for adjusting the predetermined volume of liquid released by said flush valve including means for positioning said one end of said tripping member at various positions along said actuating valve arm to adjust the predetermined volume of liquid released by said valve.

15. A flush valve for releasing a predetermined volume of liquid upon actuation thereof comprising:

a. a valve housing having an inlet with liquid under pressure therein, an outlet, and a valve seat surface between said inlet and said outlet, b. a control valve sealable with said valve seat surface and movable between an open position in which liquid flows from said inlet to said outlet and a closed position in which the flow of liquid from said inlet to said outlet is blocked, c. a control chamber between said control valve and said housing, d. means for adjusting the predetermined volume of liquid released by said flush valve upon actuation thereof, e. means for limiting the volume of liquid released by said flush valve to the predetermined amount, f. an actuating valve member connected to said control valve and movable between an open position in which said control chamber is connected to one of said inlet and said outlet and a closed position in which said control chamber is disconnected from said one of said inlet and said outlet, g. said limiting means including an extension member slideably mounted along one end of said actuating valve member, h. said limiting means having means for resiliently urging said extension member toward the one end of said actuating valve member, and i. a tripping mechanism mounted to said housing having a tripping member having one end positioned adjacent to said extension member when said control valve is in the closed position, said one end of said tripping member movable upon actuation thereof to move said actuating member to the open position, j. said extension member having an opening along an axis when said control valve is in the closed unactuated position, said one end of said tripping member received in said opening in said extension member, said tripping member being positioned along said axis of said opening of said extension member, and k. said adjusting means including means for positioning said tripping member at various positions along said extension member to adjust the predetermined volume of liquid released by said valve.

* * * * *

UNITED STATES PATENT AND TRADEMARK OFFICE
CERTIFICATE OF CORRECTION

PATENT NO. : 4,272,052
DATED : June 9, 1981
INVENTOR(S) : Robert Roy Gidner

It is certified that error appears in the above-identified patent and that said Letters Patent are hereby corrected as shown below:

Column 7, line 29 change the numeral "134" to --124--.

Column 10, line 25 change the word "releases" to --released--.

Column 14, line 37 the second "the" should be deleted.

Column 15, line 32 change the word "inactuated" to --unactuated--.

Column 16, line 29 the word "and" should be deleted.

Signed and Sealed this

*First* Day of *September 1981*

[SEAL]

*Attest:*

GERALD J. MOSSINGHOFF

*Attesting Officer*     *Commissioner of Patents and Trademarks*